Patented Jan. 13, 1925.

1,522,618

UNITED STATES PATENT OFFICE.

NORMAN E. DITMAN, OF NEW YORK, N. Y.

CORNCOB PRODUCT AND METHOD OF MAKING THE SAME.

No Drawing.    Application filed November 18, 1922. Serial No. 601,912.

*To all whom it may concern:*

Be it known that I, NORMAN E. DITMAN, a citizen of the United States of America, residing at New York, county and State of New York, have invented certain new and useful Improvements in Corncob Products and Methods of Making the Same, of which the following is a full, clear, and exact description.

The present invention relates to the use of corncob cellulose, prepared from mature dried corn-cobs, as a starting material in the manufacture of threads, filaments, films, discs, lacquers, fillers, paints and coverings, imitation leather, bristles, preservative coverings and insulators, molded articles and plastic products of all forms, from cellulose esters,—cellulose acetates and cellulose formates in particular.

The corn-cob cellulose employed may be unmodified, or in the form of hydrocellulose, oxycellulose, or corn-cob cellulose from viscose, mercerized corn-cob cellulose, any cupro-ammonium products of corn-cob cellulose or corn-cob cellulose prepared as in my copending application No. 450,961.

The basic starting material in the present invention is dry mature corn cobs, that is to say, the cobs from which ripe dry mature corn has been shelled. Corn cobs produced in United States, amount each year, to many millions of tons, the great bulk of which are annually wasted, and hence they constitute an extremely cheap material.

The cobs can be used in their original state, or can be washed, crushed to a coarse or fine meal. They can, if desired, be further purified by boiling in water, to which soda or other purifying agent may be added if desired, and they may be washed after this treatment if desired. They may also be bleached by the use of sulfur dioxid, sulfurous acid, chlorin, bleaching powder or other bleaching agents if desired. They may be converted into a purer form of cellulose by dissolving in caustic alkali and carbon bisulfid, or cupro-ammonium hydroxid solution, and subsequently precipitated therefrom by acids or acid salts if desired, all as described in detail and as claimed in my copending application No. 450,961, filed March 6, 1921.

It will be understood that after receiving any of the above preliminary treatments, the corn cob material should be dried, before being converted into the esters.

As pointed out in my copending application above identified, corn cobs contain certain other components besides cellulose, some of which other components which are capable of undergoing reaction in a measure similar to cellulose. In the present invention, when corn cobs, in their mature state, whether raw or partially purified (as by comminuting, boiling in water, boiling in dilute alkalies, bleaching, etc.,) are subjected to processes for the esterification (acetylation, etc.), of the cellulose, certain of these other substances appear to be modified to a considerable extent, so that these may be converted, (in part at least) into substances which become soluble in the solvents of the cellulose esters. These reaction products give desirable properties (for some purposes) to the cellulose acetate formed.

The acetylation can be accomplished by any one of the usual methods:—e. g., with glacial acetic acid, acetic anhydride and sulphuric acid, or by the use of any suitable catalyzer or condensing medium other than sulphuric acid—or by the substitution or addition of any other chemical or substances which may be used in the process of acetylation.

*Example 1.—Formation of cellulose acetate.*

Corn-cob cellulose, prepared as above described from mature dried corn-cobs, (bleached if desired) is dried. One part of this material is treated with four parts each of acetic acid and acetic anhydride and $\frac{1}{10}$ to $\frac{1}{4}$ parts of sulphuric acid of 66° Bé. strength. The mixture, during the reaction, is kept below 50°. The mass is allowed to remain at 40°–45° for 12–24 hours, when the nearly colorless, thick liquid mass thus obtained is poured into a large volume of water, and the precipitate is thoroughly washed and dried.

This product is then dissolved in any of the known cellulose acetate solvents such as acetone, glacial acetic acid, lactic acid, pyridine, nitrobenzene, epichlorhydrin, formic acid, acetylene tetrachloride, tetrachlorethane, ethyl acetate or chloroform and alcohol.

This solution may then be forced through spinarets, slits or into moulds. Solidification may be accomplished by evaporation or precipitation may be aided by the use of any of the known precipitants, such as water, benzol, alcohol, carbon tetrachloride or toluene.

*Example 2.—Formation of cellulose acetate.*

To 100 kgs. of dry corn-cob cellulose, preferably bleached, is added in one portion a mixture of acetic anhydride equivalent to 270 to 310 kgs. of absolute acetic anhydride, 390 to 410 kgs. glacial acetic acid and 3 to 5 litres commercial sulphuric acid of 66° Bé. strength. The acetylating mixture is poured on the cellulose, the temperature of the acetylating fluid being preferably maintained below 40° C. The mixture is stirred until transformed into a white non-transparent pasty mass—the temperature being kept below 50° C. When the mixture is homogeneous the temperature is allowed to rise to maximum. When the temperature begins to fall gentle heat is applied, and the mixture should be kept at 50°-55° C., until the liquid becomes nearly transparent.

When it becomes soluble in alcohol-free chloroform and insoluble in acetone, (as shown by treating small test portions) it is partially hydrated. For this purpose, a mixture of 50 to 65 litres of water and 60 litres of glacial acetic acid is slowly added, with constant stirring. The mixture is then kept at 40°-50° C., for 12 to 16 hours until it becomes plastic in chloroform and soluble in acetone.

The acetylated cellulose is then precipitated by slowly pouring into a large volume of cold water, it is then washed until neutral and dried at a temperature of 35°-50° C.

This product is then dissolved in any of the known solvents such as acetone, glacial acetic acid, lactic acid, pyridine, nitro-benzene, epichlorhydrin, formic acid, acetylene tetrachloride, tetrachlorethane, ethyl acetate or chloroform and alcohol.

This solution may then be poured on plates, or forced through spinarets, slits or into moulds. Solidification may be accomplished by evaporation, or precipitation may be aided by the use of any of the known precipitants, such as water, benzol, alcohol, carbon tetrachloride or toluene.

Cellulose formates may be produced from any of the previously mentioned cellulose products of mature dried corn-cobs, by the action of strong formic acid upon them, using as a catalyzer or condensing medium, sulphuric acid or any other chemical or substance which may be found suitable.

*Example 3.—Formation of cellulose formate.*

18 grams of dried corn-cob cellulose, prepared as previously described from mature dried corn-cobs, preferably bleached, are treated with 100 gms. of formic acid of sp. gr. 1.20 or 1.22, and 10 gms. of concentrated sulphuric acid, for 16 hours at 30°-35° C. After thinning with more formic acid the heavy viscous mass is separated from unacted upon cellulose, (e. g. by filtration) precipitated in a large bulk of water, washed to neutrality and dried at a low temperature.

This product is then dissolved in one of the usual solvents, such as formic acid, lactic acid, zinc chloride or a solution of chromates or bichromates.

This solution may then be poured on plates, or forced through spinarets, slits or into moulds. Solidification may be accomplished by evaporation, or precipitation may be aided by the use of solutions of methyl, ethyl or amyl alcohol, acetone, chloroform, carbon tetrachloride, acetylene tetrachloride, ethyl acetate, amyl acetate, nitrobenzene, aniline or dilute acetic, sulfuric or hydrochloric acid. (Other cellulose formate solvents which may be used are—alkali iodides and bromides, calcium chloride, ammonium nitrate, alkaline earth and other metallic nitrates, cupric chloride, cupric acetate, cuprous chloride, alkali xanthates, aniline salts and alkaline salts of aromatic mono- and poly-sulfuric acids).

In the formation of cellulose plastics, cellulose esters prepared from mature dry corn-cobs by any of the previously mentioned (or other known or possible) methods may be used.

These products may be converted into the acetate or formate according to the methods above given. In addition any of the following chemicals or substances may be added or employed in the process:—camphor, acetylene tetrachloride, carbon tetrachloride, glycerol, phenol, casein, albumen, formalin, cresols, amyl lactate, amyl acetate, amyl formate, thymol, naphthol, lactic acid, castor oil, gelatine, chloral or other products which may be of use for this purpose.

Pressure and heat may be employed in the formation of these plastic substances.

I claim:

1. A process of making a product containing organic acid esters of cellulose which comprises reacting upon mature corn cob material with an organic acid esterifying agent.

2. A process of making a product containing fatty acid esters of cellulose which comprises reacting upon mature corn cob material with a fatty acid esterifying agent.

3. A process which comprises subjecting mature corn cob material to the action of acetylating reagents.

4. A process which comprises comminuting mature dried corn cobs, bleaching the same, drying and subjecting the dried material to acetylation reactions.

5. A cellulose acetate product containing in addition to cellulose acetate, the reaction products of acetic acid with non-cellulosic organic materials which are insoluble in water, such reaction products being soluble in cellulose acetate solvents.

6. A product containing a fatty acid ester of cellulose together with a reaction product of non-cellulosic organic constituents of corn cobs with a fatty acid, such reaction products being soluble in cellulose ester solvents.

In testimony whereof I hereto affix my signature.

NORMAN E. DITMAN.